(12) United States Patent
Machida et al.

(10) Patent No.: US 7,002,729 B2
(45) Date of Patent: Feb. 21, 2006

(54) IMAGE DISPLAY MEDIUM AND MANUFACTURING METHOD OF THE SAME

(75) Inventors: Yoshinori Machida, Ashigarakami-gun (JP); Yasufumi Suwabe, Ashigarakami-gun (JP); Motohiko Sakamaki, Ashigarakami-gun (JP); Yoshiro Yamaguchi, Ashigarakami-gun (JP); Takeshi Matsunaga, Ashigarakami-gun (JP); Kiyoshi Shigehiro, Ashigarakami-gun (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 10/745,690

(22) Filed: Dec. 29, 2003

(65) Prior Publication Data

US 2004/0252362 A1    Dec. 16, 2004

(30) Foreign Application Priority Data

Jun. 11, 2003   (JP) .............................. 2003-166422

(51) Int. Cl.
*G02B 26/00* (2006.01)
*G09G 3/34* (2006.01)

(52) U.S. Cl. ..................................... 359/296; 345/107
(58) Field of Classification Search ................ 359/240, 359/243, 253, 296; 345/84, 105, 107; 430/32, 430/35, 38, 45, 60; 204/477, 478, 622
See application file for complete search history.

(56) References Cited

U.S. PATENT DOCUMENTS

2003/0227436 A1 * 12/2003 Ikeda .......................... 345/107
2004/0057104 A1 *  3/2004 Ukigaya ..................... 359/296

FOREIGN PATENT DOCUMENTS

JP         A 2001-33833       2/2001

* cited by examiner

*Primary Examiner*—Georgia Epps
*Assistant Examiner*—William Choi
(74) *Attorney, Agent, or Firm*—Oliff & Berridge, PLC (57)           ABSTRACT

A back board has a spacing member having elasticity larger than that of a spacing member formed on a display board, and the spacing member of the back board is joined with the spacing member formed on the display board. Cells are formed between the display board and the back board, and black particles and white particles which are moved by an applied electric field are sealed into the cells. Even when there is variance in heights of the spacing members on the display board and the back board, the spacing member on the back board side is elastically deformed so as to absorb the variance. As a result, the spacing member on the display board is brought into close contact with the spacing member on the back board with certainty, so that the particles sealed into the cells can be prevented from moving between the cells.

14 Claims, 9 Drawing Sheets

IMAGE DISPLAY MEDIUM AND MANUFACTURING METHOD OF THE SAME

CROSS-REFERENCE TO RELATED APPLICATION

This application claims priority under 35 USC119 from Japanese Patent Application No. 2003-166422, the disclosure of which is incorporated by reference herein.

BACKGROUND OF THE INVENTION

1. Field of the Invention

The present invention relates to a rewritable image display medium and a manufacturing method thereof.

2. Description of the Related Art

As repeatedly rewritable image display devices, image display devices for displaying an image using particles moved by an electric field are known. Such image display devices include an image display medium where electrically conductive colored particles and insulating white particles are sealed between a transparent display board and a back board facing the display board with a minute gap.

The image display medium applies an electric field between the display board and the back board and injects electric charges into the electrically conductive colored particles so as to move the colored particles towards the display board side by means of the action of the electric field and display an image according to contrast between the colored particles and the white particles.

In order to display a uniform and stable image in such an image display medium, therefore, it is important to maintain a uniform gap between the display board and the back board and evenly distribute the colored particles on the display surface. For this reason, in a conventional technique a spacing member is formed between the display board and the back board, so that the constant gap is maintained and the gap between the boards is partitioned into a plurality of cells (see Japanese Patent Application Laid-Open (JP-A) No. 2001-33833).

Figure 9:
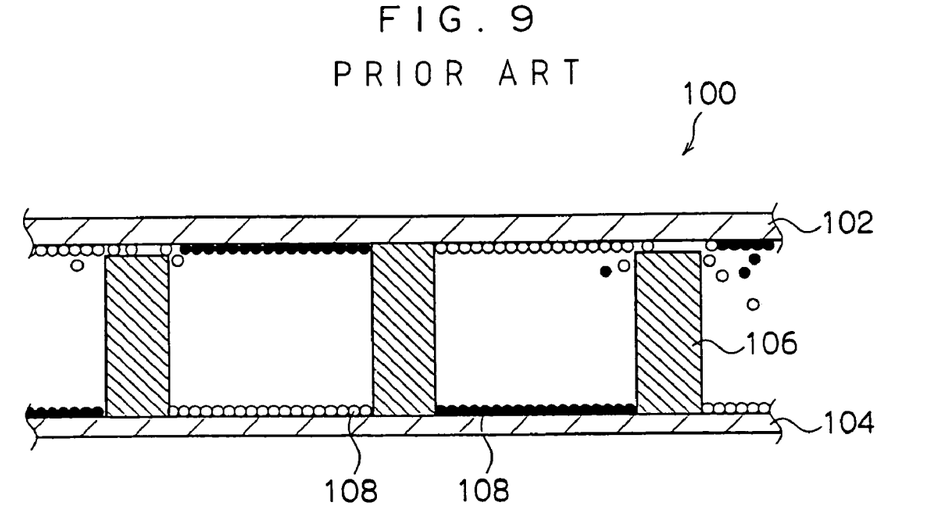
FIG. 9 is a diagram illustrating a schematic constitution of a conventional image display medium.

As shown in FIG. 9, however, when a spacing member 106 is formed on a back board 104, for example, a gap is generated between a display board 102 and the spacing member 106 due to variance in the height of the spacing member 106. Further, when an image display medium 100 is manufactured, colored particles 108 are occasionally caught between the spacing member 106 and the display board 102, and thus a gap is generated between the display board 102 and the spacing member 106.

In the case where the gap is generated between the spacing member 106 and the display board 102, as an image is repeatedly displayed, the colored particles 108 move gradually between the cells through the gap, and a quantity of the colored particles varies among the cells. Mosaic-like irregularity of display density and defective dots occur due to the movement of the colored particles 108 between the cells, and thus a stable image is not displayed.

SUMMARY OF THE INVENTION

In view of the above problem, it is an object of the invention to provide an image display medium in which a gap between a spacing member and a board or between spacing members is eliminated, movement of colored particles between cells is prevented, and a stable image can be obtained.

One aspect of the invention is an image display medium, comprising: a transparent display board having a first spacing member forming cells; a back board having a second spacing member forming cells and abutting against the first spacing member; and particles sealed into the cells formed by the first and the second spacing members between the display board and the back board and moving according to an applied electric field, wherein the first spacing member has different elasticity from that of the second spacing member. The second spacing member can have larger elasticity than that of the first spacing member.

According to the above aspect of the invention, the second spacing member, which is provided on the back board and has different elasticity from that of the first spacing member, is abutted against the first spacing member provided on the transparent display board. The cells in which particle groups are moved by an applied electric field are formed between the display board and the back board.

Even if heights of the first and the second spacing members vary, the second spacing member is elastically deformed so as to absorb the variance. As a result, since cells formed by the first and the second spacing members are brought into close contact with each other securely without generating a gap, the particles sealed into the cells can be prevented form moving between the cells. Therefore, even if the display is performed repeatedly, a stable image can be obtained without causing defective display.

DETAILED DESCRIPTION OF THE INVENTION

Figure 1:
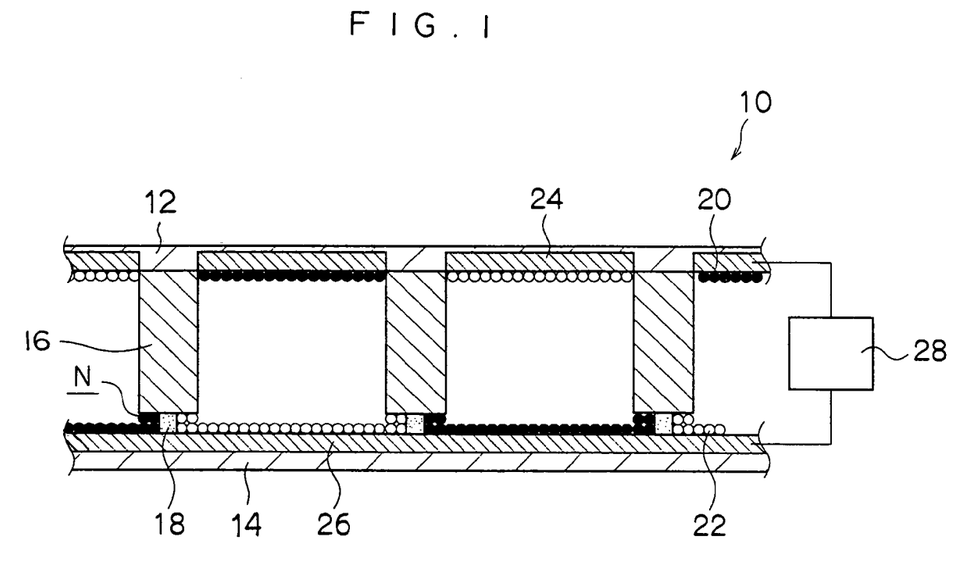
FIG. 1 is a diagram illustrating a schematic constitution of an image display medium according to a first embodiment of the present invention.

FIG. 1 illustrates one example of an image display medium 10 according to a first embodiment of the present invention. The image display medium 10 has a transparent display board 12 serving as an image display side, and a back board 14 facing the display board 12. A predetermined gap (in this embodiment, 200 μm) is formed between the display board 12 and the back board 14 by spacing members 16 and 18, which will be described later. When the spacing members 16 and 18 are set so as to abut against each other and the display board 12 is overlapped with the back board 14, the display board 12 and the back board 14 are partitioned by the spacing members 16 and 18, so that cells are formed in a lattice pattern. Positively charged black particles 20 and negatively charged white particles 22 are sealed into the cells.

In the image display medium 10, as shown in FIG. 1 for example, a plurality of linear row electrodes 24 are provided on a surface of the display board 12 facing the back board 14, and a plurality of column electrodes 26 are provided on a surface of the back board 14 facing the display board 12 so as to be orthogonal to the row electrodes 24 when the image display medium 10 is viewed from in plane view. A voltage according to an image is applied to the row electrodes 24 and the column electrodes 26 having a so-called simple matrix structure by a voltage applying device 28, so that the image can be displayed on the image display medium 10.

The display board 12 is made of a material, such as transparent glass, a transparent resin film, a plastic board material, or an acrylic material, which transmits visible light. A material with visible light transmittance of 80% or more is particularly preferable. As the row electrodes 24 formed on the display board 12, ITO electrodes are used, but another material may be used as long as it is transparent and can have a voltage applied thereto.

As the back board 14, glass, a resin board, a resin film, a resin sheet or the like is used. ITO copper foil is used for the column electrodes 26 formed on the back board 14.

A predetermined voltage not less than a voltage required to make the particles start moving is applied between the row electrodes 24 and the column electrodes 26 by the voltage applying device 28, so that black particles 20 and white particles 22 move between the display board 12 and the back board 14. For example, in the case where a predetermined positive voltage is applied to the row electrodes 24 with respect to the column electrodes 26, the black particles 20 on the side of the display board 12 move towards the back board 14, and the white particles 22 on the side of the back board 14 move towards the display board 12. Meanwhile, when a predetermined negative voltage is applied to the row electrodes 24 with respect to the column electrodes 26, the white particles 22 on the side of the display board 12 move towards the back board 14, and the black particles 20 on the side of the back board 14 move towards the display board 12.

A predetermined voltage not less than the voltage required to make the black particles 20 and the white particles 22 start moving is applied between the row electrodes 24 and the column electrodes 26 according to an image to be displayed, whereby therefore, the black particles 20 and the white particles 22 move between the display board 12 and the back board 14, and the image is displayed. After the applying of the voltage is stopped, the black particles 20 or the white particles 22 adhere to the display board 12 or the back board 14 due to an image force or the like, and the image on the display medium 10 is maintained.

As shown in FIG. 1, the row electrodes 24 are provided on the surface of the display board 12 facing the back board 14, and the column electrodes 26 are provided on the surface of the back board 14 facing the display board 12. However, the row electrodes 24 may, for example, be provided on a surface of the display board 12 that is opposite from the surface facing the back board 14, and the column electrodes 26 may be provided on a surface of the back board 14 that is opposite from the surface facing the display board 12. The structure of the electrodes is not limited to the simple matrix structure, and may be an active matrix structure.

The spacing members 16 and 18 formed on the display board 12 and the back board 14 are explained in detail below.

Figure 3:
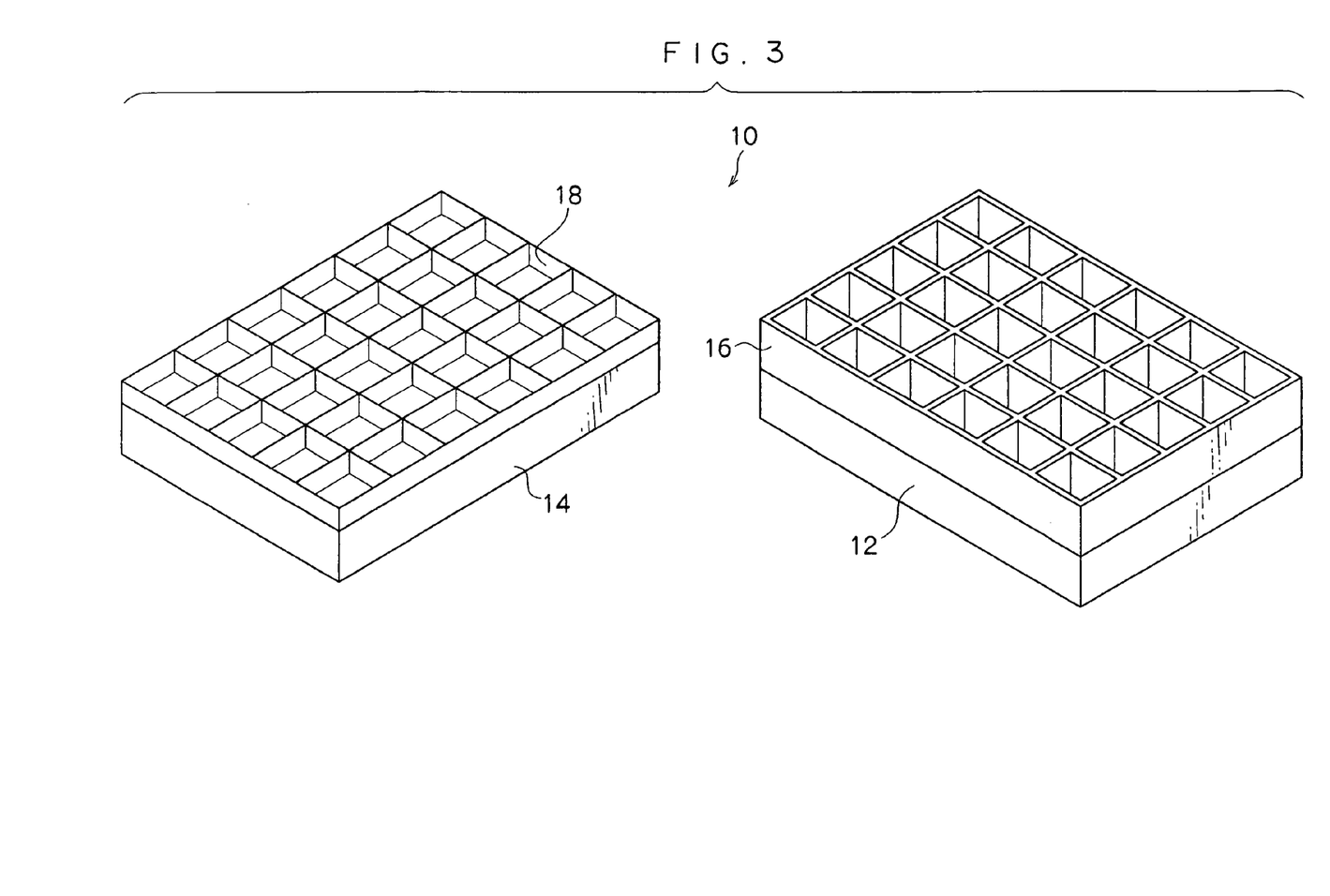
FIG. 3 is a pattern diagram illustrating a schematic constitution of the image display medium according to the first embodiment of the invention.

As shown in FIG. 3, the spacing member 16 is formed in a lattice pattern on the surface of the display board 12 facing the back board 14, with pitch intervals of 1 mm. The spacing member 16 is formed by a member which has small elasticity and is hardly deformed even if a pressure is applied thereto, such as acrylic, polyester, polycarbonate, PET, PES, PMMA or PVC.

The spacing member 16 is formed on the surface of the display board 12 facing the back board 14 by a photolithography method so as to have a height of 175 $\mu$m and a width of 100 $\mu$m (for ease of understanding in the drawing, it is drawn in an exaggerated manner).

As the method of forming the spacing member 16, not only the photolithography method but also a screen printing method, a sand blasting method, and the like can be used. However, when a high spacing member 16 is formed, the photolithography method or the sand blasting method shortens processing time in comparison with the screen printing method. Further, since the spacing member 16 can be seen through the display board 12, the photolithography method whose accuracy is higher than that of other processing methods is used and the spacing member 16 is finished with high accuracy, so that display noise can be prevented.

Meanwhile, the spacing member 18 of the lattice shape is formed on the surface of the back board 14 facing the display board 12 with pitch intervals of 1 mm. The spacing member 18 is formed by a member with large elasticity, such as acrylic resin, urethane resin, or silicone resin having elasticity. A height and a width of the spacing member 18 are smaller than those of the spacing member 16.

In this case, the spacing member 18 is formed with a height of 25 $\mu$m and a width of 50 $\mu$m on the back board 14 by the screen printing method of superposing silicone rubber ink at plural times so as to print a pattern.

As the method of forming the spacing member 18, not only the screen printing method but also the photolithography method, the sand blasting method and the like can be used. When, however, the spacing member 18 is formed with a low height is formed, the screen printing method can save on a cost of material, and thus the cost can be reduced.

The black particles 20 and the white particles 22 (here, referred to as "the particles") used in this embodiment have approximately true spherical shapes, and contact between the spacing member 16, which has small elasticity and is hardly deformed even if a pressure is applied thereto, and the particles is point contact. For this reason, a contact area between the particles and the spacing member 16 is small, and an adhering force is small. Even when the particles charged by an electric field move in cells and come into contact with the spacing member 16, the particles therefore do not adhere to the spacing member 16 and thus can move smoothly in the cells.

Meanwhile, when the particles bump against the spacing member 18 formed by the elastic resin, the spacing member 18 is elastically deformed, so that the contact area with the particles becomes large. As a result, the adhering force of the particles to the spacing member 18 becomes large, and when the charged particles come into contact with the spacing member 18, they are likely to adhere to the spacing member 18. As a result, if the spacing member 18 with large elasticity is provided on the display board 12, the particles which adhere to the spacing member 18 cause a display noise. Therefore, as shown in FIGS. 1 and 2, the spacing member 18 is formed on the back board 14 side, so that the display noise due to the particles adhering to the spacing member 18 can be prevented.

Further, the height of the spacing member 18 is set so as to be smaller than the height of the spacing member 16. That is to say, a percentage of the spacing member 18 in the cells is set to be small, so that a number of particles which adhere to the spacing member 18 can be suppressed. As a result, there is no change in a number of the particles moving in the cells, and the stable image display can be obtained.

When the particles contact with the spacing member 18, a low molecular component or the like remaining on the elastic resin adheres to the particles, and this occasionally changes charging properties of the particles. As a result, image noise may be caused. To cope with this problem, the height of the spacing member 18 is made to be small, so that the charging properties of the particles are effectively prevented from being influenced.

Figure 2:
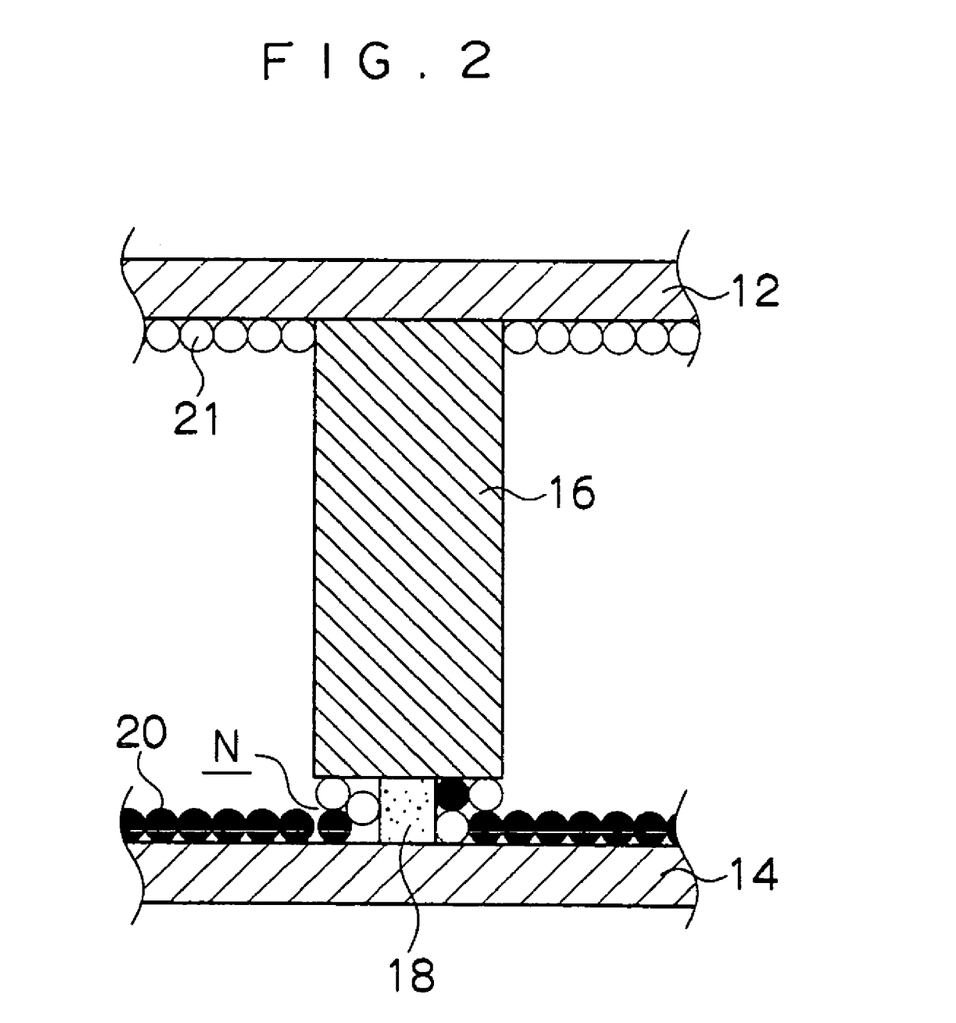
FIG. 2 is a diagram illustrating a schematic constitution of the image display medium according to the first embodiment of the invention.

Since the width of the spacing member 18 is set so as to be smaller than that of the spacing member 16, as shown in FIG. 2, a gap N is formed between the back board 14 and the spacing member 16. The particles enter the gap N and adhere to the spacing member 18, so that the gap N is filled with the particles. As a result, another particles come into contact with the particles adhering to the spacing member 16 or the spacing member 18 and do not come directly into contact with the spacing member 18. For this reason, there is no change in the charging properties of the particles, and the stable image display can be obtained.

A method of sealing the particles into the cells is explained below.

Concave portions are formed on another board such that the concave portions respectively correspond to the cells formed on the display board 12, and the positively charged black particles 20 with diameters of about 10 $\mu$m and the negatively charged white particles with diameters of about 10 $\mu$m are mixed at a predetermined ratio so as to be packed into the concave portions. Thereafter, the concave portions are covered with the display board 12. The display board 12 is inverted, so that the black particles 20 and the white particles 22 move to the display board 12. The display board 12 is put into a vacuum chamber, and the back board 14 is superposed on the display board 12 therein. A tip end of the spacing member 16 abuts against a tip end of the spacing member 18. At this time, adhesive is applied to outer peripheral portions of the spacing members 16 and 18. A lower pressure than atmospheric pressure is generated in the cells, and when the medium is taken out of the vacuum chamber, the spacing member 16 is brought into close contact with the spacing member 18 by a pressure difference with the atmospheric pressure. In such a manner, the black particles 20 and the white particles 22 are sealed into the cells between the display board 12 and the back board 14.

In the above manufacturing method, the spacing member 16 is brought into close contact with the spacing member 18 due to the cells having a lower pressure than the atmospheric pressure, so that higher adhesion properties are secured. Even when the medium is under a low atmospheric pressure condition due to air transport or the like, the close adhesion state can be maintained. It is not necessarily required to apply the adhesive to the outer peripheral portions of the spacing members 16 and 18. However, when the outer peripheral portions of the spacing members 16 and 18 are adhered and fixed in such a manner, the low pressure state in the cells can be maintained securely.

The black particles 20 and the white particles 22 are put onto the display board 12, and the back board 14 is superposed thereon, but the particles may be put onto the back board 14 and the display board 12 may be superposed thereon. Since the spacing member 18 on the back board 14 is, however, formed by an elastic body, and it is considered that the particles adhere to the spacing member 18 when the particles are moved. As a result, it is preferable that after the particles are moved to the display board 12, the back board 14 is superposed thereon.

It is not necessarily required to make the pressure inside the cells lower than the atmospheric pressure. The aforementioned steps may be executed under a normal pressure, and the display board 12 and the back board 14 may be brought into close contact with each other by pressing the image display medium 10 when the image display medium 10 is manufactured.

The image display medium 10 is formed by the above steps.

Operation of the first embodiment of the invention is explained below.

As shown in FIG. 1 or 2, the spacing member 18 whose elasticity is different from that of the spacing member 16 is abutted against the spacing member 16. As a result, even if the heights of the spacing members 16 and 18 vary, the spacing member 18 is elastically deformed so that the variance is absorbed. As a result, a gap is not formed between the cells formed by the spacing members 16 and 18 and thus the spacing members 16 and 18 are brought into close contact with each other securely, so that the black particles 20 and the white particles 22 sealed into the cells can be prevented from moving between the cells. Therefore, even when the display medium is used repeatedly, defective display does not occur, so that the stable image is obtained.

Since the spacing member 16 has the smaller elasticity than that of the spacing member 18, the black particles 20 and the white particles 22 hardly adhere to the spacing member 16. The spacing member 18 is provided on the back board 14, therefore, the display noise can be prevented.

Further, since the height of the spacing member 16 is larger than that of the spacing member 18, a percentage of the spacing member 18 forming the cells becomes small. As a result, a number of the black particles 20 and the white particles 22 which adhere to the spacing member 18 can be reduced as much as possible. For this reason, variance in the number of the black particles 20 and the white particles 22 in the cells is suppressed, so that the image can be displayed stably.

When the black particles 20 and the white particles 22 come into contact with the spacing member 18, the remaining low-molecular component or the like adheres to the elastic resin, so that the charging properties of the black particles 20 and the white particles 22 are occasionally changed. This occasionally causes the image noise. When the percentage of the spacing member 18 forming the cells is set to be small, a number of the black particles 20 and the white particles 22, whose charging properties may change, is suppressed as much as possible, so that image noise can be prevented.

Further, the width of the spacing member 18 is set to be smaller than that of the spacing member 16. As a result, the gap N is formed between the back board 14 and the spacing member 16. The black particles 20 and the white particles 22 enter the gap N and adhere to the spacing member 18 so that the gap N is filled up. Some of the black particles 20 and the white particles 22 which adhere to the gap N, therefore, prevent the other black particles 20 and white particles 22 from coming into contact with the spacing member 18. For this reason, the charging properties of the black particles 20 and the white particles 22 are not changed, so that the stable image display can be obtained.

Figure 4:
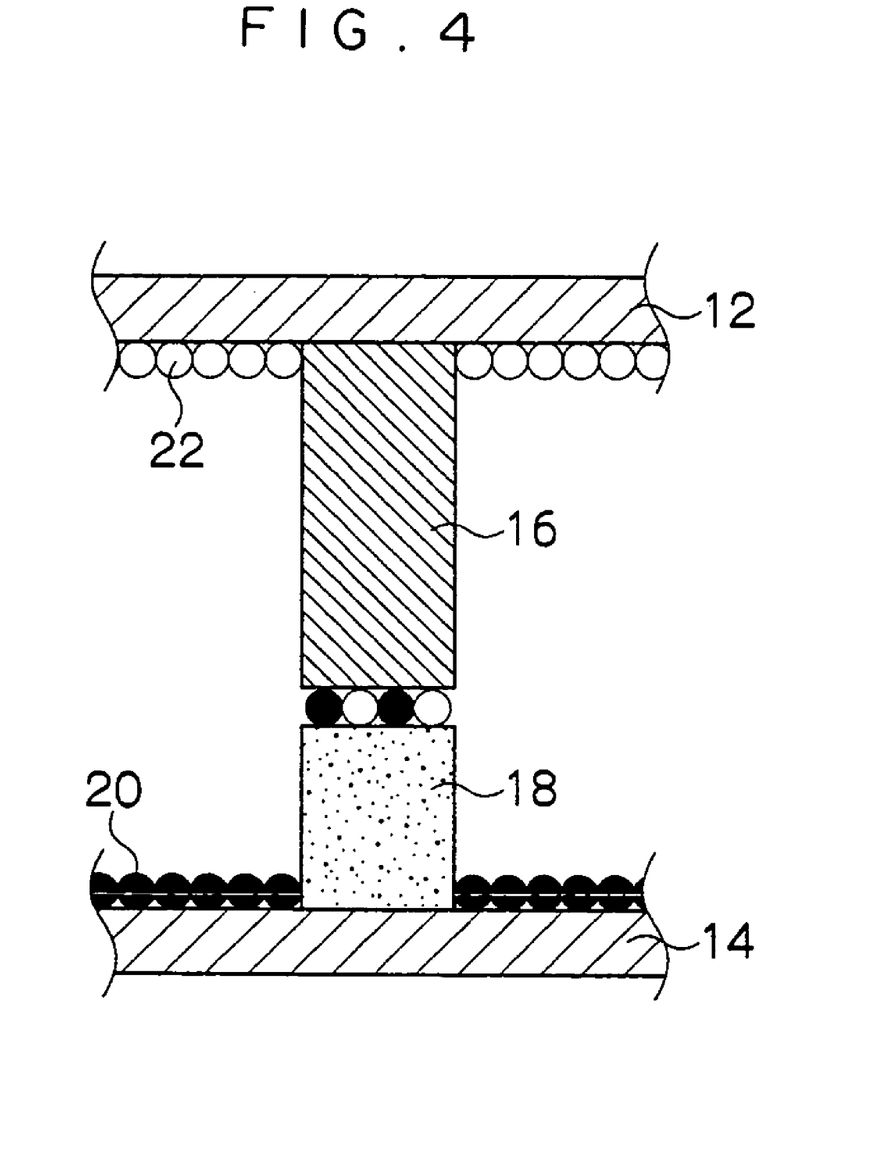
FIG. 4 is a diagram illustrating a schematic constitution of the image display medium according to the first embodiment of the invention.

In this embodiment, the constitution is such that the spacing members 16 and 18 are abutted against each other so as to closely contact each other, but as shown in FIG. 4, a gap through which one black particle 20 or white particle 22 can pass may be formed between the spacing members 16 and 18. In the case where the spacing member 18 is formed by a material with small elasticity, when the gap is formed between the spacing members 16 and 18, the black particles 20 and the white particles 22 can pass through the gap. Like in this embodiment, however, in the case where the gap is formed between the spacing member 16 and the spacing member 18 formed by the elastic body, if the black particles 20 or the white particles 22 try to pass through the gap, the black particles 20 or the white particles 22 adhere to the spacing member 18. As a result, the gap between the spacing members 16 and 18 is filled with the black particles 20 or the white particles 22. As a result, the black particles 20 and the white particles 22 can be prevented from further passing through the gap.

Figure 5A:
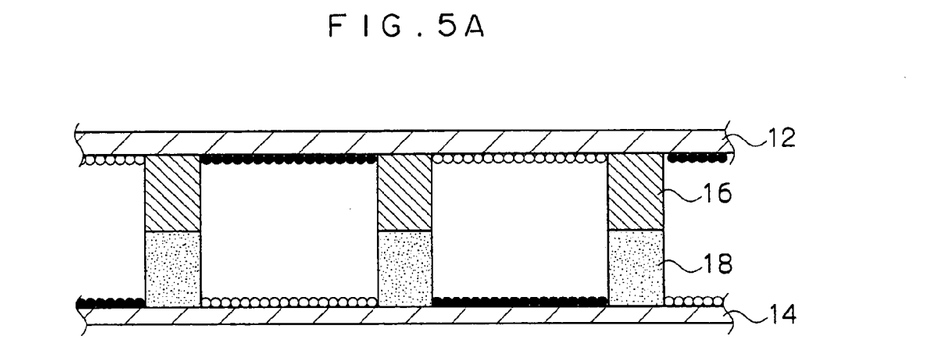
FIGS. 5A and 5B are diagrams illustrating other examples of the image display medium according to the first embodiment of the invention.

In this embodiment, the spacing member 18 is formed on the back board 14, and its height and width are smaller than those of the spacing member 16 formed on the display board 12. If the spacing member 18 is formed by an elastic body (for example, urethane type two-pack reactive screen ink having elasticity after heat curing or masking ink for sand blasting having elasticity after UV curing), which has large elasticity and does not change the charging properties of the black particles 20 and the white particles 22 contacting therewith, as shown in FIG. 5A, the spacing member 18 may be formed with the same height and width as those of the spacing member 16.

Figure 5B:
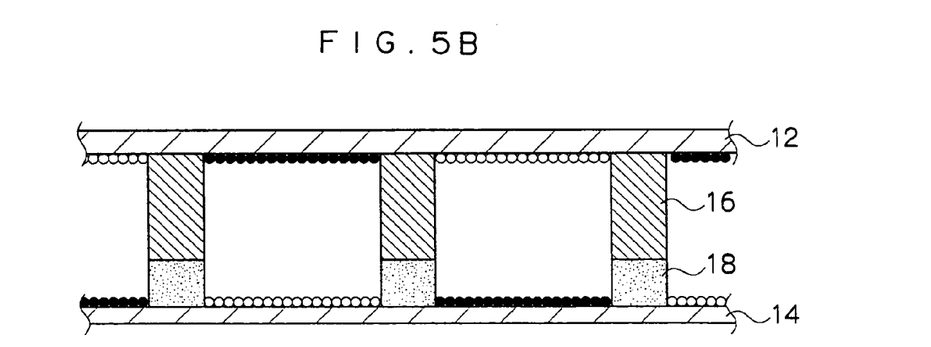

Further, like in this embodiment, it is not necessarily required to set the width of the spacing member 18 so as to be smaller than that of the spacing member 16. As shown in FIG. 5B, when the height of the spacing member 18 is set to be smaller than that of the spacing member 16, the percentage of the spacing member 18 in the cells becomes small. For this reason, a number of the black particles 20 and the white particles 22 adhering to the spacing member 18 can be reduced, and a number of the particles in the cells is not changed to an extent which influences the image display.

An image display medium according to a second embodiment of the invention is explained below. Description of parts that are similar to those in the first embodiment is omitted.

Figure 6:
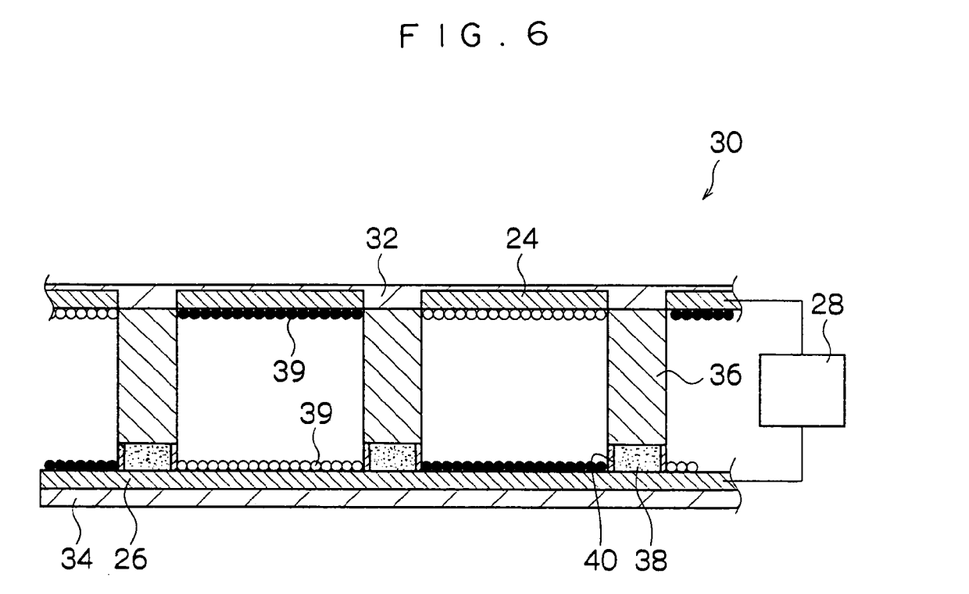
FIG. 6 is a diagram illustrating a schematic constitution of the image display medium according to a second embodiment of the invention.

As shown in FIG. 6, the image display medium 30 includes the transparent display board 32, and the back board 34 facing the display board 32. The spacing member 36 is formed on the surface of the display board 32 facing the back board 34, and the spacing member 38 is formed on the surface of the back board 34 facing the display board 32.

The spacing member 36 is formed by a member which has small elasticity and is hardly deformed even if a pressure is applied thereto. On the contrary, the spacing member 38 is formed by elastic resin so as to have the approximately same width as that of the spacing member 34.

The surface of the spacing member 38 is covered or coated with a coating member 40. As the coating member 40, a material, which has smaller elasticity than that of the elastic resin forming the spacing member 38, is used. For example, the surface of the spacing member 38 may be coated with a polycarbonate thin film. In this embodiment, the polycarbonate is used as the coating material 40, but fluorine or silicone can be used. In order that the particles are unlikely to adhere to the material to be used for the coating material 40, it is preferable that a surface energy thereof is small.

Operation of the second embodiment is explained below.

As shown in FIG. 6, the spacing member 38 is formed by the elastic resin, and the surface of the spacing member 38 is covered with the coating material 40 which is composed of polycarbonate having small elasticity and small surface energy. With such a constitution, when the back board 34 is superposed on the display board 32, the spacing member 38 is elastically deformed, so as to absorb the variance in the heights of the spacing members 36 and 38. As a result, the spacing members 36 and 38 are brought into close contact with each other. Even when the particles 39 come into contact with the coating material 40 on the surface of the spacing member 38, the coating material 40 is unlikely to be deformed due to its hardness, and the adhesion force is weak. For this reason, the particles 39 can be prevented from adhering to the spacing member 38, i.e., the adhesion of the particles 39 can be reduced. Further, even when the particles 39 come into contact with the coating member 40, a substance included in the coating material 40 does not adhere to the particles 39, and thus the charging properties of the particles 39 do not change.

The variance in the heights of the spacing members 36 and 38 is absorbed, and the stable image display can be obtained.

In this embodiment, the spacing member 38 whose surface is covered with the coating material 40 is formed on the back board 34, but it may be formed on the display board 32. Since the surface of the spacing member 38 is covered or coated with the coating material 40, the particles 39 do not adhere to the spacing member 38. For this reason, even when the spacing member 38 is formed on the display board 32, display noise is not generated.

A method of manufacturing the image display medium 50 according to a third embodiment of the invention is explained below. Description of parts similar to those in the first embodiment is omitted.

Figure 7:
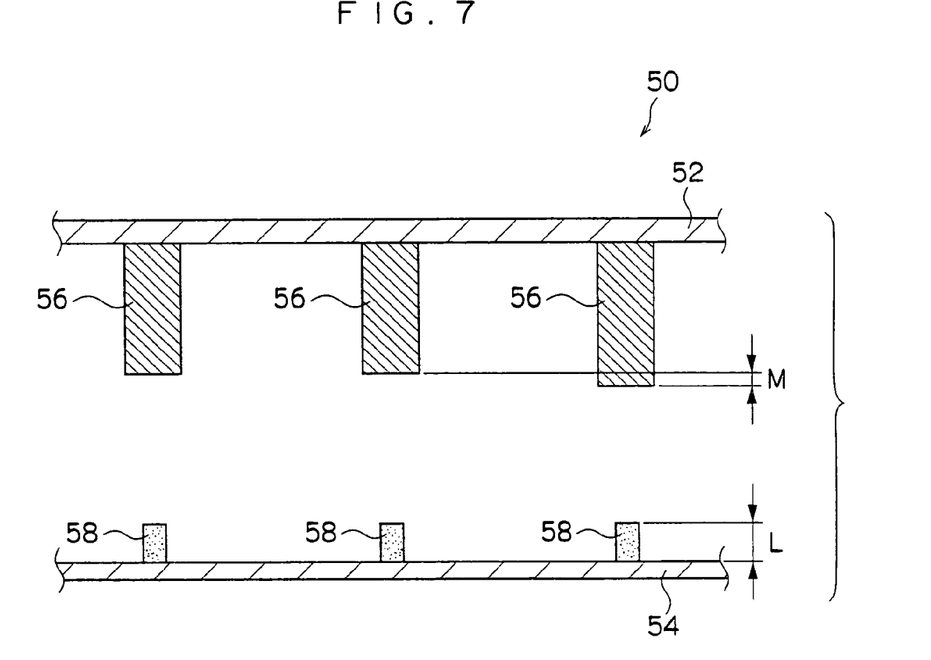
FIG. 7 is a diagram illustrating a schematic constitution of the image display medium according to a third embodiment of the invention.

As shown in FIG. 7, the image display medium 50 includes the transparent display board 52, and the back board 54 facing the display board 52. The spacing member 56 is formed on the display board 52, and the spacing member 58 is formed on the back board 54. The spacing member 56 is formed by a member which has small elasticity and is hardly deformed even if a pressure is applied thereto, and the spacing member 58 is formed by the elastic resin, for example. Further, a height L of the spacing member 58 is set to be larger than a variance M of the height of the spacing member 56.

Operation of the third embodiment of the invention is explained below.

When the image display medium 50 is formed by superposing the display board 52, on which the spacing member 56 is formed, on the back board 54, on which the spacing member 58 is formed, as shown in FIG. 7, the height L of the spacing member 58 formed with the elastic resin is set to be larger than the variance M of the height of the spacing member 56. As a result, the spacing member 58 is elastically deformed so as to absorb the variance in the height of the spacing member 56 securely.

An image forming device 60 according to a fourth embodiment of the invention is explained below.

Figure 8:
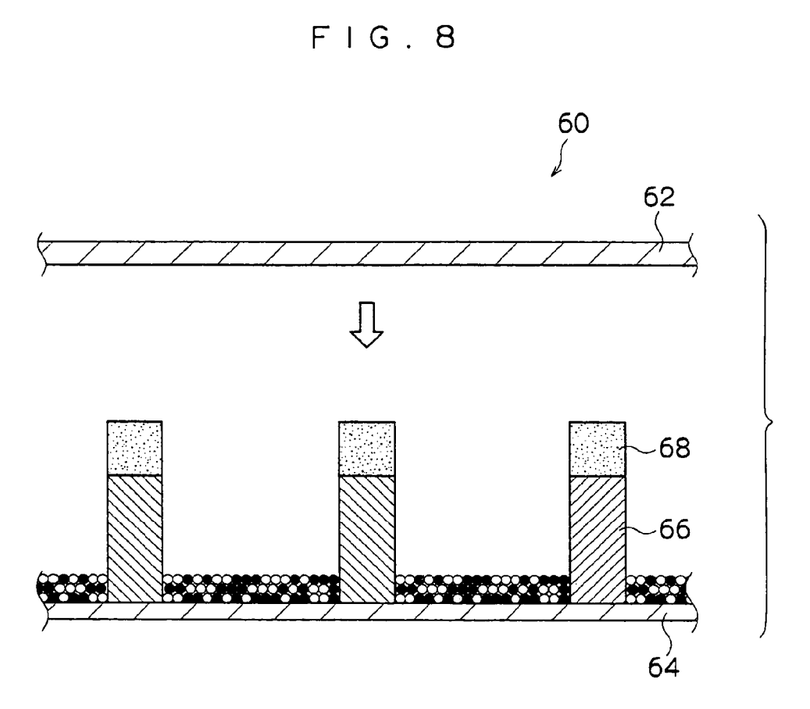
FIG. 8 is a diagram illustrating a schematic constitution of the image display medium according to a fourth embodiment of the invention.

As shown in FIG. 8, the image forming device 60 includes the transparent display board 62, and the back board 64 facing the display board 62. The spacing member 66 is formed on the back board 64. The spacing member 66 is formed with a member which has small elasticity and is hardly deformed even if a pressure is applied thereto. Further, an elastic body 68 whose elasticity is larger than those of the spacing member 66 and the display board 62 is laminated on a tip end of the spacing member 66.

Operation of the fourth embodiment of the invention is explained below.

As shown in FIG. 8, the elastic body 68, whose elasticity is larger than that of the display board 62, is laminated on the spacing member 66 formed on the back board 64. When the display board 62 is superposed on the backboard 64, the elastic body 68 absorbs the variance in the height of the spacing member 66. Since the elastic body 68, therefore, is brought into close contact with the display board 62 securely, the particles in the cells do not move between the cells, so that stable image display can be obtained.

In this embodiment, the spacing member 66 is formed on the back board 64, and the elastic body 68 is laminated on its tip end. The spacing member 66 may be, however, formed on the display board 62, and the elastic body 68 may be laminated on its tip end.

Since the invention has the above constitution, a gap between the spacing member and the board or between the spacing members is eliminated, so that movement of the colored particles between the cells is prevented. As a result, a stable image can be obtained.

What is claimed is:

1. An image display medium, comprising:
    a transparent display board having a first spacing member forming cells;
    a back board having a second spacing member forming cells and abutting against the first spacing member; and
    particles sealed into the cells formed by the first and the second spacing members between the display board and the back board and moving according to an applied electric field,
    wherein the first spacing member has different elasticity from that of the second spacing member, wherein the second spacing member is formed by an elastic body having larger elasticity than that of the first spacing member.

2. An image display medium according to claim 1, wherein a height of the first spacing member from the display board is larger than a height of the second spacing member from the back board.

3. An image display medium according to claim 1, wherein the particles are composed of particle groups having different colors.

4. An image display medium, comprising:
    a transparent display board having a first spacing member forming cells;
    a back board having a second spacing member forming cells and abutting against the first spacing member; and
    particles sealed into the cells formed by the first and the second spacing members between the display board and the back board and moving according to an applied electric field,
    wherein the first spacing member has different elasticity from that of the second spacing member, wherein a surface of the second spacing member is covered with a member having smaller elasticity than that of the second spacing member.

5. An image display medium, comprising:
    a transparent display board having a first spacing member forming cells;
    a back board having a second spacing member forming cells and abutting against the first spacing member; and
    particles sealed into the cells formed by the first and the second spacing members between the display board and the back board and moving according to an applied electric field,
    wherein the first spacing member has different elasticity from that of the second spacing member, wherein surfaces of the second spacing member exposed to the cells are covered with polycarbonate.

6. An image display medium, comprising:
    a transparent display board having a first spacing member forming cells;
    a back board having a second spacing member forming cells and abutting against the first spacing member; and
    particles sealed into the cells formed by the first and the second spacing members between the display board and the back board and moving according to an applied electric field,
    wherein the first spacing member has different elasticity from that of the second spacing member, wherein a width of the second spacing member is smaller than that of the first spacing member.

7. An image display medium, comprising:
    a transparent display board having a first spacing member forming cells;
    a back board having a second spacing member forming cells and abutting against the first spacing member; and
    particles sealed into the cells formed by the first and the second spacing members between the display board and the back board and moving according to an applied electric field,
    wherein the first spacing member has different elasticity from that of the second spacing member, wherein a pressure that is lower than an atmosphere pressure is generated between the display board and the back board.

8. An image display medium manufacturing method, comprising the steps of:
    providing a transparent display board having a first spacing member forming cells;
    providing a back board having a second spacing member forming cells;
    providing particles, which can be moved by application of an electric field, at at least one of the display board and the back board; and
    joining the second spacing member to the first spacing member in an abutted manner to seal the particles into the cells formed between the display board and the back board,
    wherein the second spacing member has larger elasticity than that of the first spacing member.

9. An image display medium manufacturing method according to claim 8, wherein the first spacing member is formed on the display board by a photolithography method.

10. An image display medium manufacturing method according to claim 8, wherein the second spacing member is formed on the back board by a screen printing method.

11. An image display medium manufacturing method according to claim 8, wherein a height of the second spacing member from the back board is larger than a variance in a height of the first spacing member from the display board.

12. An image display medium, comprising:
    a transparent display board;
    a back board facing the display board;
    a spacing member formed on one of the display board and the back board and having a tip end which is joined with the other of the display board and the back board so as to form cells between the display board and the back board; and particles sealed into the cells and moving according to an applied electric field, wherein an abutting member is laminated on the tip end of the spacing member, and elasticity of the abutting member is larger than those of the spacing member and the one of the display board and the back board that is joined with the spacing member.

13. An image display medium according to claim 12, wherein the spacing member is formed on the back board.

14. An image display medium, comprising:
a transparent display board;
a back board arranged facing the display board;
a spacer arranged between the display board and the back board for providing multiple divided regions therebetween; and
particles sealed into the multiple divided regions,
wherein the spacer is joined with the display board or the back board via a member having elasticity different from that of the spacer, wherein the member has larger elasticity than that of the spacer, and a height of the spacer is larger than a height of the member.

* * * * *